United States Patent Office 3,506,706
Patented Apr. 14, 1970

3,506,706
PROCESS FOR PREPARING ENOL ACETATES OF CYCLIC KETONES
Walter A. Gay, New Haven County, and Desmond Sheehan, Hamden, Conn., assignors to The Techni-Chem Company, Wallingford, Conn., a corporation of Connecticut
No Drawing. Filed Sept. 8, 1967, Ser. No. 666,468
Int. Cl. C07c 49/56
U.S. Cl. 260—488                                    11 Claims

ABSTRACT OF THE DISCLOSURE

Cyclic ketones, and particularly cyclohexanone, cycloheptanone and cyclooctanone, are reacted with acetic anhydride using hydrogen iodide as a catalyst to form the corresponding enol acetates.

BACKGROUND OF THE INVENTION

Enol acetates of cyclic ketones such as cyclohexanone have been produced by reaction of the ketone with acetic anhydride using catalysts such as sulfuric acid, toluene sulfonic acid, difluorophosphoric acid and perchloric acid. Reaction times have been long, and the reaction does not lend itself to continuous operation. Side reactions leading to tars have also been encountered.

It has also been proposed to use different and more expensive acylating agents, such as isopropenyl acetate and ketene. Somewhat more rapid reactions result, but still with the ordinary catalysts the reactions do not lend themselves to continuous operations. The enol acetates are useful in a number of reactions, for example, with nitric acid to produce nitro ketones as described and claimed in the co-pending application of Sheehan and Vellturo, Ser. No. 613,726, filed Feb. 3, 1967, and assigned to the assignee of the present application. As these products can be used as intermediates in syntheses, leading to caprolactam in the case of nitrocyclohexanone, cost is an important factor.

SUMMARY OF THE INVENTION

The present invention increases the rate at which enol acetates of cyclic ketones such as cyclohexanone, cycloheptanone, and cyclooctanone, and cyclodecanone by using as a catalyst hydriodic acid in place of the other commonly used catalysts. There is some evidence that the actual catalyst may be acetyl iodide, because if HI is reacted with acetic anhydride to produce acetyl iodide, this compound also acts as an effective catalyst. However, the exact nature of the compound during the actual catalysts has not been completely proven and it is therefore not intended to limit the invention to any theory of action. Therefore, in referring to a reaction between the ketone and acetic anhydride in the presence of hydrogen iodide, it is not intended that this expression shall be restricted to the hydrogen iodide remaining as such throughout the reaction.

Not only is there a very great increase in reaction rate as compared to the best of the catalysts used before, sulfuric acid, but hydrogen iodide is quite volatile, and so is a continuous reaction it is recyclable. The same is true of acetyl iodide and it is, therefore, of no particular concern whether the actual compound during the reaction itself is hydriodic acid or acetyl iodide. The other catalysts, such, as sulfuric acid, phosphorus acid, toulene sulfonic acid, and in the like, are not sufficiently volatile and thus, in a continuous reaction, they could not be recycled; and therefore even if they permitted as high a rate of reaction as hydriodic acid, they would not be readily usable in continuous reactions.

It is not known why the marked increase in reaction rates is obtainable with hydrogen iodide because it is not just a question of acid strength, that is to say, dissociation constant. Fluoroboric acid, $HBF_4$, is an extremely strong acid but does not catalyze the desired reaction. In the case of cyclohexanone, instead of producing the enol acetate large amounts of an aldol condensation type product are obtained from two molecules of cyclohexanone.

It is an advantage of the present invention that the amount of catalyst used is not particularly critical. In general amounts from 5 to 6 moles of catalyst per mole of ketone give good results, which is in line with experience with other catalysts. Larger amounts of catalyst may be used but do not confer any benefit and of course increase cost of operation.

It should be noted that quite a high degree of selectivity, approaching 100%, is achieved, which is of importance in the minimizing of undesired side reactions. It should be noted that while it is possible to obtain fairly high reaction rates when enormous quantities of sulfuric acid are used, ten times normal, the selectivity, while fairly good at short times, decreases very markedly at longer times, whereas with hydrogen iodide there is little or no change in yield with longer times and in fact an actual increase in the case of cyclohexanone.

Reaction temperatures are not greatly different from that which has been used before with other catalysts. Temperatures above 100° C. are customarily used, for example from 130° to 150° C. Reagent proportions are also not critical, but for best results an excess of acetic anhydride should be present. This is not contrary to experience with other catalysts where a moderate excess of the order of mole ratio of 1:3 is also normally used. It will thus be seen that the improved reaction rates of the present invention are obtainable without increasing reagent cost.

It is possible to use hydrogen iodide with other acylating agents, such as ketene and isopropenyl acetate, but the advantages are more marked in reactions with acetic anhydride, which therefore constitutes a preferred embodiment.

DESCRIPTION OF THE PREFERRED EMBODIMENTS

The invention will be described in connection with the following examples, in which equilibrium reactions are carried out so that exact quantitative results may be obtained.

EXAMPLE 1

Cyclohexanone was reacted with acetic anhydride at a mole ratio of 1:3, the temperature being maintained at 140° C., which was chosen as this is approximately the boiling point of acetic anhydride and, therefore, the temperature most effectively usable in a continuous reaction which could be carried out under reflux. The amount of catalyst was 5.4 mmoles per mole of ketone, and results at various times were determined. The results of the reaction are summarized in the following table:

TABLE 1

| Catalyst | Mmole catalyst per mole of ketone | Time, mins. | Percent yield of enol acetate | Selectivity |
|---|---|---|---|---|
| HI | 5.4 | 2 | 68.3 | 97.5 |
|  | 5.4 | 5 | 75.5 | 99.0 |
|  | 5.4 | 10 | 76.0 | 100.0 |
| $CH_3COI$ | 5.4 | 3 | 74.3 | 97.0 |
|  | 5.4 | 5 | 75.5 | 99.0 |
|  | 5.4 | 15 | 75.0 | 98.7 |
| $H_2SO_4$ | 5.4 | 2 | 27.2 | 58.2 |
|  | 5.4 | 10 | 53.6 | 75.4 |
|  | 54.0 | 2 | 68.7 | 94.0 |
|  | 54.0 | 10 | 59.7 | 81.0 |

It will be noted that with HI very high yields were obtainable at 5 minutes with almost perfect selectivity, the increase at 10 minutes being insignificant. Quite a good yield and satisfactory selectivity was obtained in as short a time as 2 minutes. It will be noted that the results with sulfuric acid were markedly inferior both with respect to yield and selectivity and were quite poor at 2 minutes except when an enormous excess of sulfuric acid was used, in which case at 2 minutes the yield was not better than with HI, the selectivity poorer, and the results decreased at longer time. This shows that even if an enormous excess of sulfuric acid is used, it is by no means satisfactory and of course the catalyst does not lend itself to continuous reactions.

EXAMPLE 2

The procedure of Example 1 was repeated with HI and the smaller amount of sulfuric acid, replacing the cyclohexanone with an equivalent amount of cycloheptanone. The results appear in Table 2.

TABLE 2

| Catalyst | Mmole catalyst per mole of ketone | Time, mins. | Percent yield of enol acetate |
|---|---|---|---|
| HI | 5.4 | 2 | 48.0 |
|  | 5.4 | 10 | 47.0 |
| $H_2SO_4$ | 5.4 | 2 | 28.9 |
|  | 5.4 | 10 | 38.8 |

It will be seen that while the yield is not quite as high as with cyclohexanone, it is still adequate at 2 minutes and lends itself, therefore, to continuous operation. The results are very markedly better than with sulfuric acid.

EXAMPLE 3

The procedure of Example 2 was repeated replacing the cycloheptanone with an equivalent amount of cyclooctane. The results appear in the following table.

TABLE 3

| Catalyst | Mmole catalyst per mole of ketone | Time, mins. | Percent yield of enol acetate |
|---|---|---|---|
| HI | 5.4 | 2 | 70.0 |
|  | 5.4 | 10 | 69.3 |
| $H_2SO_4$ | 5.4 | 2 | 52.0 |
|  | 5.4 | 10 | 52.7 |

It will be noted that HI as good yields were obtained as with cyclohexanone. Cyclooctanone gives better yields with sulfuric acid at short times than does cyclocyclohexanone but still markedly inferior to HI.

We claim:
1. In a process of producing cyclic ketone enol acetates by heating an alicyclic ketone having the keto group as a part of the alicyclic ring ketone with an excess of acetylating agent in the presence of a catalyst, the improvement in which the catalyst is hydriodic acid.
2. A process according to claim 1 in which the acetylating agent is acetic anhydride.
3. A process according to claim 2 in which the ketone is selected from the group consisting of cyclohexanone, cycloheptanone and cyclooctanone.
4. A process according to claim 3 in which the reaction is effected at approximately the boiling point of acetic anhydride.
5. A process according to claim 4 in which the ketone is cyclohexanone.
6. A process according to claim 5 in which the hydrogen iodide is first reacted with acetic anhydride to form acetyl iodide and this is added to the reaction mixture of cyclohexanone and acetic anhydride.
7. A process according to claim 3 in which the ketone is cyclohexanone.
8. A process according to claim 3 in which the ketone is cycloheptanone.
9. A process according to claim 3 in which the ketone is cyclooctanone.
10. A process according to claim 9 in which the reaction is effected at approximately the boiling point of acetic anhydride.
11. A process according to claim 8 in which the reaction is effected at approximately the boiling point of acetic anhydride.

References Cited

UNITED STATES PATENTS

| 2,383,965 | 9/1945 | Gwynn et al. | 260—488 |
| 2,461,016 | 2/1949 | Young | 260—488 |
| 3,043,862 | 7/1962 | Altenschöpfer et al. | 260—488 |

LORRAINE A. WEINBERGER, Primary Examiner

V. GARNER, Assistant Examiner

U.S. Cl. X.R.

260—586